(12) United States Patent
Shi

(10) Patent No.: US 6,796,242 B2
(45) Date of Patent: Sep. 28, 2004

(54) PROPULSION ENHANCEMENT ARRANGEMENT FOR ROCKET

(76) Inventor: Zhong-Wei Shi, Room 101, No.35, Lane 1661, Changning Road, Shanghai, PRC, 200051 (CN)

( * ) Notice: Subject to any disclaimer, the term of this patent is extended or adjusted under 35 U.S.C. 154(b) by 0 days.

(21) Appl. No.: 10/351,127

(22) Filed: Jan. 27, 2003

(65) Prior Publication Data

US 2004/0144280 A1 Jul. 29, 2004

(51) Int. Cl.[7] .......................... F42B 15/36; F42B 15/10
(52) U.S. Cl. ...................................... 102/378; 102/517
(58) Field of Search ............................... 102/374, 377, 102/378, 393, 489, 517, 518

(56) References Cited

U.S. PATENT DOCUMENTS

| | | | | |
|---|---|---|---|---|
| 2,945,442 A | * | 7/1960 | Adelman et al. | 102/378 |
| 4,597,333 A | * | 7/1986 | Bocker et al. | 102/518 |
| 4,648,324 A | * | 3/1987 | McDermott | 102/518 |
| 6,276,277 B1 | * | 8/2001 | Schmacker | 102/374 |
| 6,494,140 B1 | * | 12/2002 | Webster | 102/374 |
| 6,568,330 B1 | * | 5/2003 | Kaiserman et al. | 102/374 |

FOREIGN PATENT DOCUMENTS

| | | | | |
|---|---|---|---|---|
| GB | 1051972 | * | 12/1966 | 102/374 |
| WO | WO90/00244 | * | 1/1990 | 102/374 |

* cited by examiner

Primary Examiner—Michael J. Carone
Assistant Examiner—James S. Bergin
(74) Attorney, Agent, or Firm—Raymond y. Chan; David and Raymond Patent Group

(57) ABSTRACT

A rocket includes a front warhead, a rear propellant actuator, and a propulsion enhancement arrangement. The propulsion enhancement arrangement includes a storage chamber positioned between the warhead and the propellant actuator for storing a predetermined amount of explosive materials to provide propelling impulse upon controlled explosion thereof, and a time-sensitive trigger device operatively communicated with the storage chamber, wherein the time sensitive trigger device includes a timing device and an ignition trigger operatively communicated with each other such that the ignition trigger is arranged to ignite the explosive materials stored inside the storage chamber at a particular predetermined time to generate a propelling impulse to further accelerate and propel the warhead to hit the a targeted object.

12 Claims, 4 Drawing Sheets

PROPULSION ENHANCEMENT ARRANGEMENT FOR ROCKET

BACKGROUND OF THE PRESENT INVENTION

1. Field of Invention

The present invention relates to a rocket, and more particularly to a propulsion enhancement arrangement for a rocket which is capable of substantially increasing the hitting range and acceleration of the rocket without inducing significant weight and fuel consumption thereof.

2. Description of Related Arts

Rockets have widely been used for accomplishing a wide variety of purposes, though most of which are of military nature. Conventionally, rockets can broadly be divided into two distinct types in terms of the principles or source of energy by which they propel when they are launched. The first category is known of a 'self-propellant' type. As the name implies, each of the rockets concerned usually comprises a propeller wherein compressed air is flowed out therefrom so as to, by simple theory of fluid mechanics, 'push' the rocket in a predetermined or targeted direction at a very high speed.

The second category of rockets is those dependent upon an 'external' source of propulsion. What is meant here is that the rockets concerned need to be propelled by a launching device which utilizes highly pressurized air or impulse of controlled combustion to 'push' the rear portions of the rockets so as to accelerate or propel them at an extremely high speed. A distinguishing feature of this kind of rockets is that they generally possess extremely high degree of acceleration when launched.

As one might foresee, the utilization of rockets involves precise control and monitoring of the whole launching and hitting processes which in turn require sophisticated equipments and well-qualified personnel. All these, plus the potential disastrous consequences if the rockets are improperly or unlawfully handled, make the operation both extremely expensive as well as restrictive, i.e. beyond the reach of ordinary people.

Nevertheless, the chase of more effective propulsion methodologies and cheaper operation or manufacturing cost of rockets is still prevailing. The operation implication of the second category of rockets is that a complicated launching device is usually needed to provide satisfactory acceleration and the hitting range of the rockets.

By way of comparison, on the other hand, the first category of conventional rocket involves no less problems than its first counterpart. As a matter of practical constraints, the acceleration of the rockets, when launched, is quite limited, and at least to be significantly lower than that of the rockets of the first type. The underlying reason is that for those first type rockets, their propellants, due to engineering difficulty, only can provide a rather limited acceleration to the rockets. Moreover, this kind of rockets can, due to its operational principles, usually have a shorter hitting range as compared with the second kind of the rockets.

As a result, for the first category of conventional rockets, their effectiveness and values with regard to their practical applications are substantially limited, if not unsatisfactory. Indeed, no one is willing to wield a low quality tools, or to say that in a narrower sense, weapon, in a critical circumstance wherein a mere malfunction or 'incompetence' of equipments may decide an unfavourable consequence.

The present invention serves to substantially overcome the above difficulties so as to provide a more optimal yet novel rocket, indirectly contributing technological advancement of human beings.

SUMMARY OF THE PRESENT INVENTION

A main object of the present invention is to provide a rocket with a propulsion enhancement arrangement that is capable of, when launched, enhancing a hitting range and acceleration thereof as compared with conventional arts of the same kind.

Another object of the present invention is to provide a rocket with a propulsion enhancement arrangement which comprises a propulsion impulse generator, installed between a warhead and a propelling actuator, adapted to generate a controllable propelling impulse to further propel the warhead so as to substantially enhance the hitting range and the acceleration thereof without causing fatal damage to the warhead to fail its mission.

Another object of the present invention is to provide a rocket with a propulsion enhancement arrangement which can substantially reduce the overall weight of the rocket to enhance the hitting range and the acceleration of the rocket. Accordingly, the weight of the propulsion enhancement arrangement is 10% of the overall weight of the rocket in comparison with the convention propulsion system which is 90% of the overall weight of the rocket.

Another object of the present invention is to provide a rocket with a propulsion enhancement arrangement which can not only enhance the hitting range and acceleration thereof, but also can preserve its accuracy in hitting a predetermined target.

Another object of the present invention is to provide a rocket with a propulsion enhancement arrangement which does not significantly consume more fuel or energy of any forms than the conventional self-propellant rockets.

Another object of the present invention is to provide a rocket with a propulsion enhancement arrangement, wherein the cost of the propulsion enhancement arrangement is inexpensive comparing with the conventional propulsion system, so as to substantially reduce the overall cost of the rocket.

Another object of the present invention is to provide a rocket with a propulsion enhancement arrangement which does not significantly alter the original design of each part of the rocket so as to minimize the manufacturing and related cost of the present invention. Accordingly, the structural design of the propulsion enhancement arrangement is capable of being incorporated with a conventional missile to enhance the performance thereof such as the hitting range.

Accordingly, in order to accomplish the above objects, the present invention provides a rocket, comprising:

a warhead;

a propellant actuator which is spacedly provided on a rear side of said warhead for generating propelling force to propel the warhead in a predetermined orientation and at a predetermined speed; and a propulsion enhancement arrangement which comprises:

a propulsion impulse generator, which is mounted between the warhead and the propellant actuator, comprising:

a storage chamber for storing a predetermined amount of explosive materials therein; and a time-sensitive trigger device operatively communicated with the storage chamber, wherein when said rocket is launched at a predetermined elevation, the time-sensitive trigger device is capable of triggering a propelling explosion of the explosive materials in the storage chamber in such a manner that the warhead is exploded to intactly separate from the storage chamber and is propelled by a propelling impulse generated by the propelling explosion in the predetermined orientation and acceleration.

These and other objectives, features, and advantages of the present invention will become apparent from the following detailed description, the accompanying drawings, and the appended claims.

DETAILED DESCRIPTION OF THE PREFERRED EMBODIMENT

Figure 1:
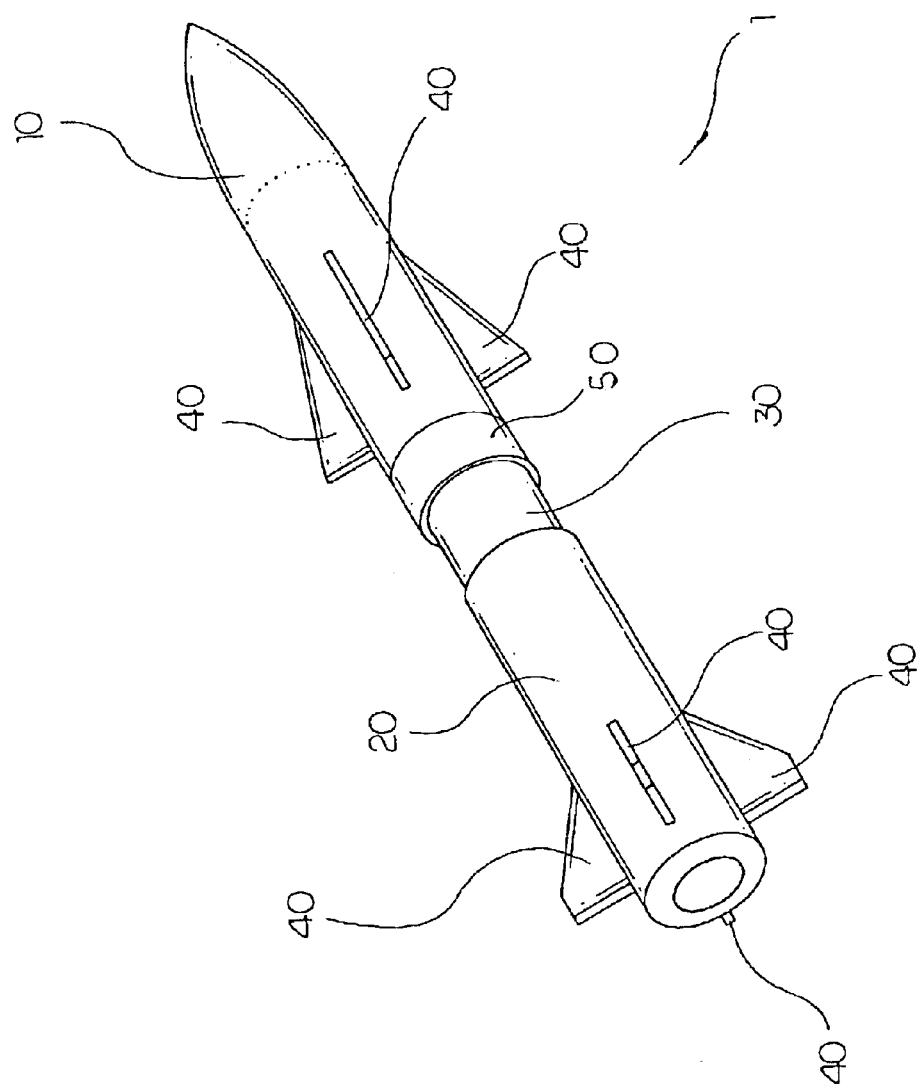
FIG. 1 is a perspective view of a rocket with a propulsion enhancement arrangement according to a first preferred embodiment of the present invention.
Figure 2:
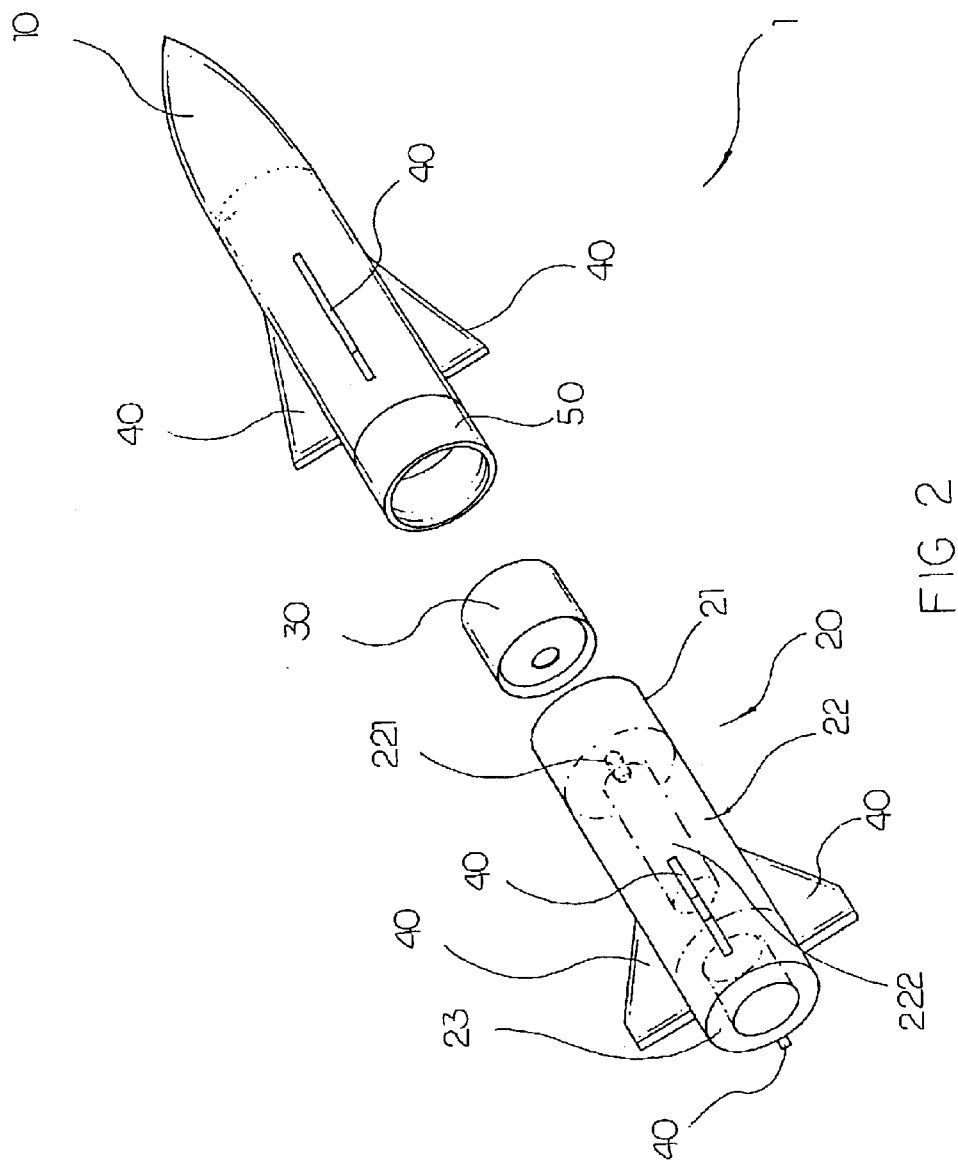
FIG. 2 is an exploded perspective view of a rocket with a propulsion enhancement arrangement according to the above first preferred embodiment of the present invention.

Referring to FIGS. 1 to 2 of the drawings, a rocket 1 with a propulsion enhancement arrangement 30 according to a first preferred embodiment of the present invention is illustrated. According to the first preferred embodiment, the rocket 1 is embodied as a self-propellant type rocket and is capable of being launched by a conventional rocket launching platform. The rocket 1 comprises a front warhead 10, a rear propellant actuator 20, and a propulsion enhancement arrangement 30.

The warhead 10 has a predetermined amount of explosive materials securely received therein, wherein the explosive materials are capable of being triggered to explode so as to destroy the objects being targeted by a launcher of the rocket 1. The explosive materials, according to the first preferred embodiment, can be those of conventionally used in the warhead of the conventional and regular rocket.

The propellant actuator 20 is positioned at a rear side of the warhead 10 for propelling the rocket 1 to move in a predetermined orientation. Technically, the propellant actuator 20 comprises a combustion chamber 21 fuelled with a predetermined amount of propelling fuel. According to the first preferred embodiment, the propellant fuel can take the form of particulates of inorganic oxidizer such as ammonium perchlorate, aluminum powder fuel, or alternatively, it can take the form of fluid polymer fuel, such as, an uncured, liquid carboxy terminated polybutadiene.

The propelling actuator 20 further comprises an ignition system 22 comprising a fuel igniter 221 provided on the combustion chamber 21 for igniting the propelling fuel stored therein, and a pressurized gas generator 222 operatively connected with the combustion chamber 21 and energized by the fuel stored in the combustion chamber 21 upon a series of controlled combustions so as to generate high pressurized gas to propel the rocket 1.

Accordingly, the propelling actuator 20 further comprises a gas propelling nozzle 23 communicated with the pressurized gas generator 222 wherein highly pressurized gas generated from the pressurized gas generator 222 is ejected via the gas propelling nozzle 23 so as to propel the rocket 1 at a predetermined speed and orientation. The predetermined speed should be extremely high to facilitate effective accomplishment a mission of the rocket 1 of the present invention.

Figure 3:
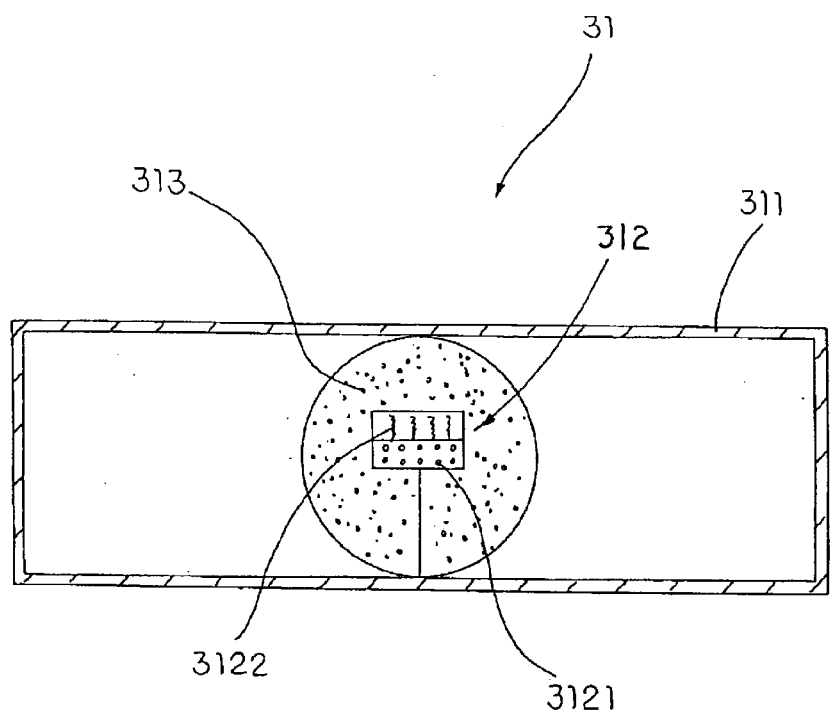
FIG. 3 is a sectional side view of the propulsion enhancement arrangement according to the above first preferred embodiment of the present invention.

Referring to FIGS. 2 to 3 of the drawings, the propulsion enhancement arrangement 30 comprises a propulsion impulse generator 31 operatively mounted between the front warhead 10 and the rear propellant actuator 20. In turn, the propulsion impulse generator 31 comprises a storage chamber 311, having a tubular shaped, which is arranged to store a predetermined amount of explosive materials 313 to provide propelling impulse upon controlled explosion thereof. According to the first preferred embodiment, the explosive materials 313 should be of highly explosive property, such as trinitrotoluene $[C_7H_5(NO_2)_3]$ (TNT).

As shown in FIG. 3, the explosive materials 313 is stored in the storage chamber 311 in a spherical shape and enclosed by foam material to retain the position of the explosive materials 313 in the storage chamber 311. Accordingly, the volume of the spherical shaped explosive materials 313 is approximately 606 $cm^3$ and a diameter thereof is approximately 5.83 cm, and a density of the explosive materials 313 is approximately 1.65 $g/cm^3$.

The propulsion impulse generator 31 further comprises a time-sensitive trigger device 312 operatively communicated with the storage chamber 311, wherein the time sensitive trigger device 312 comprises a timing device 3121 and an ignition trigger 3122 operatively communicated with each other in such a manner that the ignition trigger 3122 is arranged to ignite the explosive materials 313 stored inside the storage chamber 311 at a particular predetermined time which is pre-set to the timing device 3121.

Accordingly, the time-sensitive trigger device 312 is embodied to be mounted inside the storage chamber 311 within the explosive materials 313, as shown in FIG. 3, wherein the total amount of explosive materials 313 stored inside the storage chamber 311 is determined such that during the explosion triggered by the ignition trigger 3122, the rocket 1 of the present invention is exploded to separate into three distinct categories: namely the front warhead 10, the rear propellant actuator 20, and the exploded propulsion impulse generator 30, wherein the front warhead 10, rather than being destroyed or functionally damaged, is further accelerated and propelled by an propelling impulse generated by the explosion at a predetermined velocity, i.e. a predetermined speed and orientation. In other words, the effect of the explosion is controlled such that the impulse arising from the explosive form the propelling impulse for further propelling the front warhead 10 at an enhanced acceleration without inducing any significant functional damage to the front warhead 10.

Thus, it is worth accentuating that one skilled in the art would appreciate during the final journey of the front warhead 10, that is, from the point of explosion of the propulsion impulse generator 30 to the targeted object, it no longer requires fuel to be propelled, and that the propelling impulse generated by the explosion is capable of providing the warhead 10 sufficient, and actually enhanced, acceleration and speed at a well-defined orientation in relation to the targeted object.

In order to enhance the accuracy and controllability of the rocket 1, the rocket 1 should further comprises a plurality of stabilizing fins 40 outwardly and radially extended from the front warhead 10 and the propellant actuator 20 respectively in such a manner that they are capable of balancing the aerodynamics forces acting on the rocket 1 while it is in the air on the way to the targeted object. The stabilizing fins 40 are embodied to be made in accordance with the conventional fluid mechanics and aerodynamics theories.

The rocket 1 further a stabilizing fin controller 50 mounted at a rear side of the warhead 10 for adjusting an angle of each of the stabilizing fins 40 at the warhead 10 so as to precisely directing the warhead 10 towards the targeted object.

Figure 4:
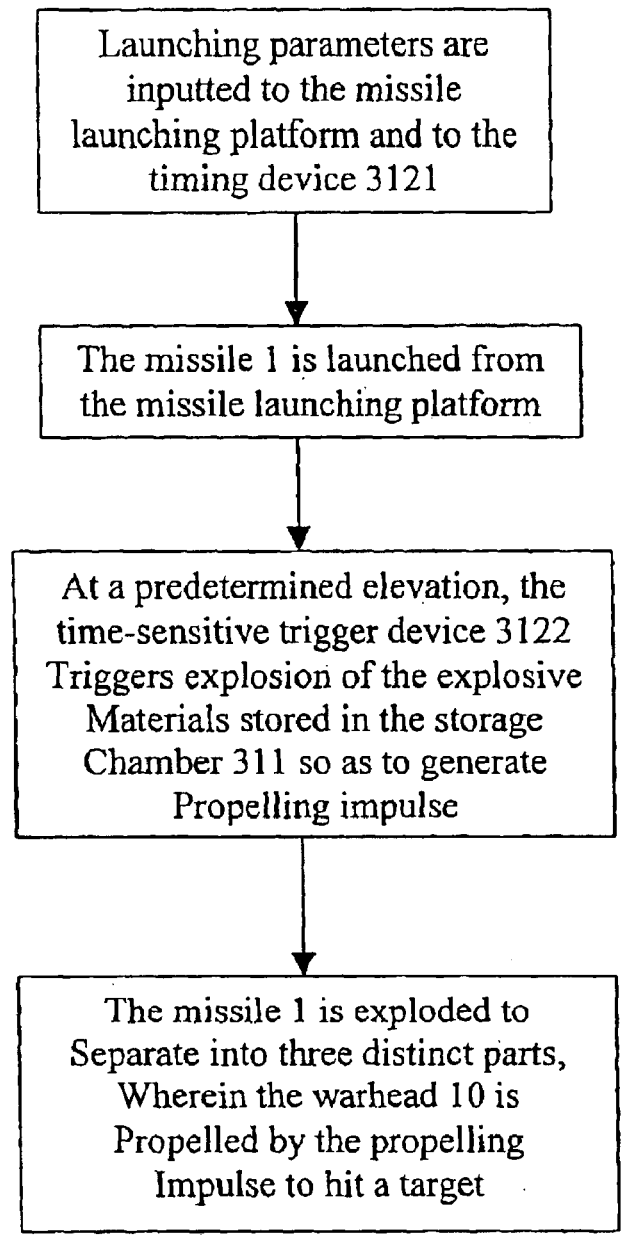
FIG. 4 is a flow diagram of the operation of the rocket incorporated with the propulsion enhancement system according to the above first preferred embodiment of the present invention.

Referring to FIG. 4 of the drawings, the operation of the rocket 1 of the present invention is as follows:

Prior to the launching of the rocket 1, a predetermined set of parameters is input into the propulsion impulse generator 31 as to control the timing and elevation of the explosion that generate the propelling impulse, it is also at this stage which determines the amount of explosive materials 313 used for propelling the front warhead 10 to a desire position, taken in account the position and the nature of the targeted objects.

Then, the rocket 1 can be launched by a conventional rocket launching platform at a predetermined orientation and at a predetermined speed. Depending the inputted parameters of the rocket 1, when the rocket 1 has been reached at a predetermined elevation in the air, which is equivalent to a particular time after launching, the time-sensitive trigger device will then trigger an explosion of the explosive material stored inside the storage chamber.

The explosion will then generate the propelling impulse which further propels the front warhead 10 to the targeted object. The stabilizing fin 40 which is extended form the warhead 10 still balances the various aerodynamics forces acting on the warhead 10 until it hit the target. On the other hand, after the explosion, the rear propellant actuator and the exploded propelling impulse generator will then of little practical importance and naturally fall down from the air where the explosion has taken place. According to the first preferred embodiment of the present invention, the explosion preferably takes place at 200 m elevation with respect to the launching level.

As an illustration, a set of figures from the operation of the rocket 1 of present invention is extracted and quoted below: given the hitting range of the original rocket is 180 km, cursing speed is 1800 m/s, and the weight of the warhead is 150 kg. When the propulsion enhancement arrangement is utilized, with approximately 1 kg of explosive materials 313, wherein the explosive materials 313 being TNT which has a potential energy of 1000 cal/g, then, the hitting range of the rocket can be enhanced to 3500km with cursing speed of 5000 m/s. As a matter of fact, the hitting range of the rocket 1 can be enhanced to between 300 km to 10000 km, depending on the various parameters governing the launching of the rocket 1 and the explosion of the explosive materials 313 of the storage chamber 311 of the propulsion impulse generator 31.

It is worth to mention that the weight of the conventional propulsion system is at least 90% of the overall weight of the rocket. The performance of the rocket will be minimized because of the heavy weight of the conventional propulsion system. Accordingly, the weight of the propulsion enhancement arrangement 30 of the present invention is approximately 10% of the overall weight of the rocket 1 such that when the rocket 1 is employed with the propulsion enhancement arrangement 30, the weight of the rocket 1 can be substantially reduced so as to enhance the hitting range and the acceleration of the rocket 1.

In addition, the propulsion enhancement arrangement 30 can be incorporated with a missile to enhance the performance of the missile such as the hitting distance and the acceleration. Accordingly, the hitting range of the missile is longer than that of the rocket so that the missile may require a lighter and powerful propulsion system. Therefore, the propulsion enhancement arrangement 30 can be incorporated with the conventional missile, especially the short distance missile, to obtain a better performance while being cost effective.

From the forgoing elaborations of the present invention, one skilled in the art should be able to appreciate that the rocket 1 is capable of substantially accomplishing the objects stated. Furthermore, the applicability of the propulsion enhancement arrangement 30 shouldn't be limited to those rockets 1 in which air is the medium of their application. Conceivably, the propulsion enhancement arrangement 30 can also be adopted to incorporate into other kinds of explosive constructions such as torpedoes rockets of various kinds, and the likes.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A rocket, comprising:

a front warhead;

a rear propellant actuator for generating propelling force to propel said warhead in a predetermined orientation and at a predetermined speed; and a propulsion enhancement arrangement comprising a propulsion impulse generator operatively mounted between said front warhead and said rear propellant actuator, wherein a predetermined set of parameters is input into said propulsion impulse generator to control a timing and an elevation in air of an explosion that generates a propelling impulse, wherein said propulsion impulse generator comprises:

a storage chamber positioned between said front warhead and said rear propellant actuator;

a predetermined amount of explosive material selected from a group consisting of trinitrotoluene which is stored in said storage chamber and enclosed by a foam material to retain a spherical shape in said storage chamber to provide propelling impulse upon controlled explosion thereof, wherein said predetermined amount of explosive material is arranged for propelling said front warhead to a predetermined position; and a time-sensitive trigger operatively communicated with said storage chamber, wherein said time sensitive trigger device comprises a timing device and an ignition trigger operatively communicated with each other in order to ignite said explosive material stored in said storage chamber at a predetermined time pre-set to said timing device, wherein when said rocket reaches said elevation in air according to said predetermined set of parameters inputted, said time-sensitive trigger triggers said explosion of said explosive material stored in said storage chamber, wherein said explosion generates said propelling impulse which further propels said front warhead to said predetermined position at a predetermined velocity and after said explosion, said rear propellant actuator and said propelling impulse generator are separated from said front warhead.

2. The rocket, as recited in claim 1, wherein said time-sensitive trigger is mounted inside said storage chamber within said explosive material.

3. The rocket, as recited in claim 2, further comprising a set of stabilizing fins extended from said warhead to balance aerodynamic forces acting on said warhead.

4. The rocket, as recited in claim 3, wherein said explosive material has a volume of 606 cm$^2$, a diameter of 5.83 cm, and a density of 1.65 g/ cm$^2$.

5. The rocket, as recited in claim 2, wherein said explosive material has a volume of 606 cm$^2$, a diameter of 5.83 cm, and a density of 1.65 g/ cm$^2$.

6. The rocket, as recited in claim 1, further comprising a set of stabilizing fins extended from said warhead to balance aerodynamic forces acting on said warhead.

7. The rocket, as recited in claim 6, wherein said explosive material has a volume of 606 cm$^2$, a diameter of 5.83 cm, and a density of 1.65 g/ cm$^2$.

8. The rocket, as recited in claim 1, wherein said explosive material has a volume of 606 cm$^2$, a diameter of 5.83 cm, and a density of 1.65 g/ cm$^2$.

9. A propulsion enhancement arrangement for a rocket which comprises a front warhead and a rear propellant actuator for generating propelling force to propel the warhead in a predetermined orientation and at a predetermined speed, wherein said propulsion enhancement arrangement comprises:

a propulsion impulse generator for operatively mounting between the front warhead and the rear propellant actuator, wherein a predetermined set of parameters is input into said propulsion impulse generator to control a timing and an elevation in air of an explosion that generates a propelling impulse, wherein said propulsion impulse generator comprises:

a storage chamber for positioning between the front warhead and the rear propellant actuator;

a predetermined amount of explosive material selected from a group consisting of trinitrotoluene which is stored in said storage chamber and enclosed by a foam material to retain a spherical shape in said storage chamber to provide propelling impulse upon controlled explosion thereof, wherein said predetermined amount of explosive material is arranged for propelling the front warhead to a predetermined position; and a time-sensitive trigger operatively communicated with said storage chamber, wherein said time sensitive trigger device comprises a timing device and an ignition trigger operatively communicated with each other in order to ignite said explosive material stored in said storage chamber at a predetermined time pre-set to said timing device, wherein said time-sensitive trigger triggers said explosion of said explosive material stored in said storage chamber when the rocket reaches said elevation in air according to said predetermined set of parameters inputted, wherein said explosion generates said propelling impulse for propelling the front warhead to said predetermined position at a predetermined velocity while the rear propellant actuator and said propelling impulse generator are separated from the front warhead after said explosion.

10. The rocket, as recited in claim 9, wherein said time-sensitive trigger is mounted inside said storage chamber within said explosive material.

11. The rocket, as recited in claim 10, wherein said explosive material has a volume of 606 cm$^2$, a diameter of 5.83 cm, and a density of 1.65 g/ cm$^2$.

12. The rocket, as recited in claim 9, wherein said explosive material has a volume of 606 cm$^2$, a diameter of 5.83 cm, and a density of 1.65 g/ cm$^2$.

* * * * *